(12) United States Patent
Johnson et al.

(10) Patent No.: US 9,022,462 B2
(45) Date of Patent: May 5, 2015

(54) STOWABLE AIRCRAFT CABIN ATTENDANT SEAT

(71) Applicant: B/E Aerospace, Inc., Wellington, FL (US)

(72) Inventors: Wade Johnson, Edmonds, WA (US); James Brian Hauser, Clinton, WA (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 14/198,139

(22) Filed: Mar. 5, 2014

(65) Prior Publication Data

US 2014/0252830 A1    Sep. 11, 2014

Related U.S. Application Data

(60) Provisional application No. 61/775,180, filed on Mar. 8, 2013.

(51) Int. Cl.
*B64D 11/06* (2006.01)
*B60N 2/30* (2006.01)
*B60N 2/24* (2006.01)

(52) U.S. Cl.
CPC ............ *B64D 11/06* (2013.01); *B64D 11/0689* (2013.01); *B60N 2/30* (2013.01); *B60N 2/24* (2013.01); *B60N 2/242* (2013.01)

(58) Field of Classification Search
CPC .................................................... B64D 11/0691
USPC .................................. 297/14, 350; 244/118.5
See application file for complete search history.

(56) References Cited

U.S. PATENT DOCUMENTS

| 5,615,848 A | 4/1997 | Ceriani |
| 2012/0280541 A1 | 11/2012 | Funk et al. |
| 2014/0048650 A1 | 2/2014 | Schliwa et al. |
| 2014/0209741 A1 | 7/2014 | Boenning et al. |

FOREIGN PATENT DOCUMENTS

FR    2842477 A1    1/2004

OTHER PUBLICATIONS

International Search Report, Jul. 28, 2014, 5 pages.

*Primary Examiner* — Sarah B McPartlin
(74) *Attorney, Agent, or Firm* — Fulwider Patton LLP

(57) ABSTRACT

A retractable flight attendant chair includes an anchor box, a sled coupled to the anchor box for horizontal translation of the retractable chair into and out of the stowage compartment, and a chair mounted on the sled. The chair includes an expanding/folding backrest and seat portion that allows the chair to be stowed in a small envelope compartment when not in use.

7 Claims, 9 Drawing Sheets

STOWABLE AIRCRAFT CABIN ATTENDANT SEAT

CROSS-REFERENCES TO RELATED APPLICATIONS

This application claims priority from U.S. Provisional Application No. 61/775,180, filed Mar. 8, 2013, incorporated herein by reference in its entirety.

BACKGROUND

Efficiency and economy are critical factors in every aircraft, and this is particularly critical in smaller commercial aircraft. Single aisle commercial aircraft are especially stringent when it comes to the number of seats that can be accommodated, since each additional row of seats represents a higher percentage of profitability as compared with larger aircraft. However, the floor plans of these smaller aircraft are typically fixed by other constraints, thereby limiting the number of seats available. Any arrangement that allows for additional seats represents a significant advance that corresponds with a consequential opportunity for profitability.

The majority of single-aisle aircraft include an aft lavatory and galley arrangement like that shown in FIG. 1. In this arrangement, first and second lavatories 15, 17 are positioned forward of the rear doors 11, 13 on either side of a center aisle 21 of aircraft 10, and are located behind a last row of passenger seats 19. In addition, a full galley 20 is located aft of the rear doors 11, 13 and forward of the aircraft's pressure dome 30. The galley 20 typically extends across the full width of the rearmost portion of the passenger cabin, and includes galley carts, storage units, ovens, beverage makers, and the like.

In today's commercial airline industry, airline companies prefer passenger cabin arrangements that maximize the number of seats available for passengers. Unfortunately, increasing the number of seats in an aircraft can reduce the amount of space available for lavatories and food service galleys. Accordingly, there is a need for a high passenger solution ("HPS") for the aft portion of a single-aisle aircraft like that shown in FIG. 1, which provides space for at least one additional row of passenger seats, and provides a galley that is capable of supporting a satisfactory level of food service for passengers. In addition, there is a need for such a HPS that includes at least one lavatory that is accessible by Person's with Restricted Mobility (PRM), and at least one Cabin Attendant Seat (CAS).

U.S. Provisional Patent Application No. 61/763,284 discloses a compact aircraft galley and lavatory arrangement for an aircraft that meets the needs of a high passenger solution. The arrangement adds another row of seating without sacrificing performance or function of the galley or other components. However, in order to configure the galley and new row of seats, a new design for an attendant seat is needed. The present invention is directed to a new cabin attendant seat that retracts into the wall when not in use, and expands from a folded up configuration to allow the seat to be stowed in a modest storage compartment.

SUMMARY OF THE INVENTION

The present invention is an aircraft cabin attendant seat that can be stowed in a narrow compartment when not in use. The seat slides out from its stowage compartment on a sled, and unfolds to a full attendant seat.

DETAILED DESCRIPTION OF THE MAIN EMBODIMENTS

Figure 2:
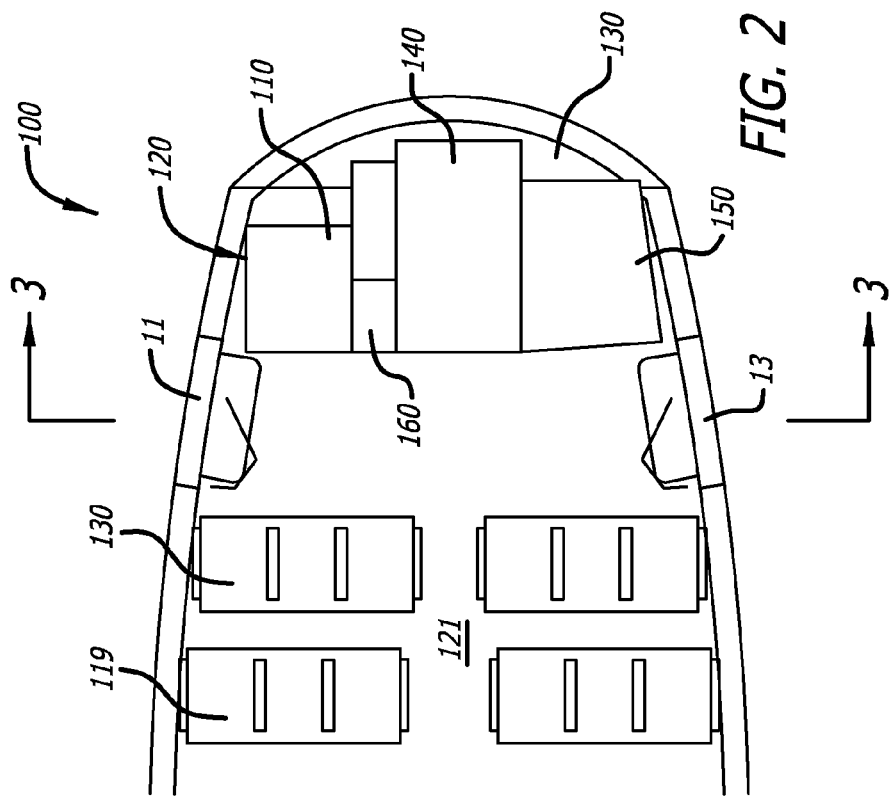
FIG. 2 is a plan view of a high passenger solution configuration of a galley adding an additional row of seats.
Figure 1:
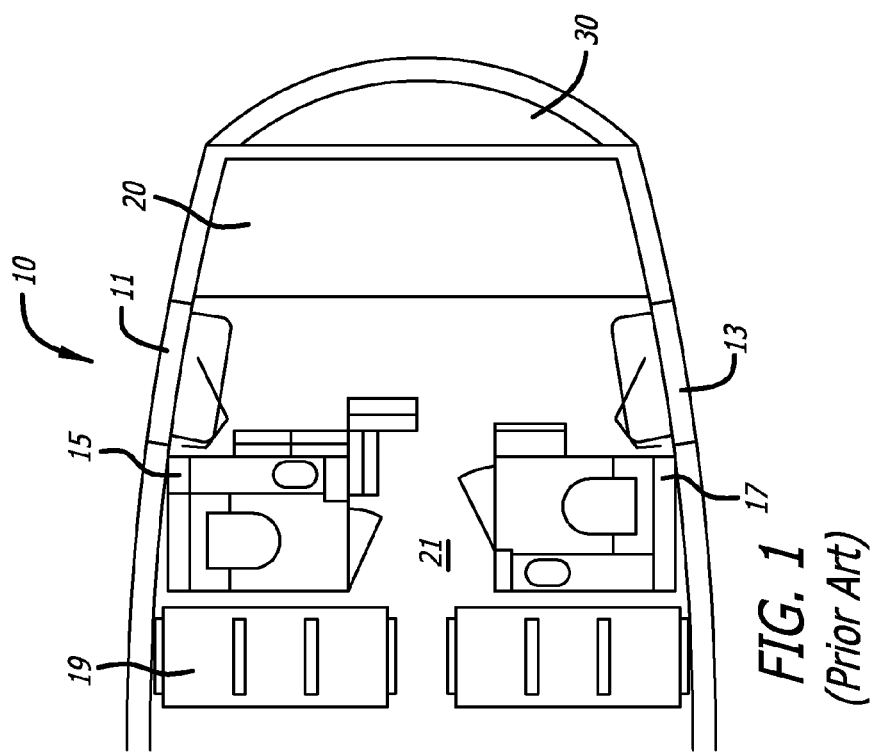
FIG. 1 is a plan view of a prior art single aisle aircraft.

One presently preferred embodiment of an HPS according to the invention which satisfies the needs described above is shown in FIGS. 2 and 3. As shown in FIG. 2, in this arrangement, one additional row of passenger seats 130 is located between the aft doors 11, 13 and the previous last row of seats 119 in a single-aisle aircraft 100. In addition, a combination lavatory/galley arrangement 120 is located aft of the rear doors 11, 13, and at least partially rearwardly extends into the aircraft's pressure dome 130. In the arrangement shown in FIGS. 2-3, the lavatory/galley arrangement 120 includes a galley portion 110 on one side, and a pair of forward-facing lavatories 140, 150 on an opposite side. Each lavatory 140, 150 includes a door 141, 151. The galley portion 110 can include stowage for multiple standard storage units 117, stowage for a plurality of galley carts or trolleys 113, at least one trash trolley 112, a sink 119, and a plurality of food service inserts including ovens 115 and a water boiler 118. An electrical panel 114 is also provided. In addition, the galley can include a Galley Waste Disposal Unit (GWDU) 111.

Figure 3:
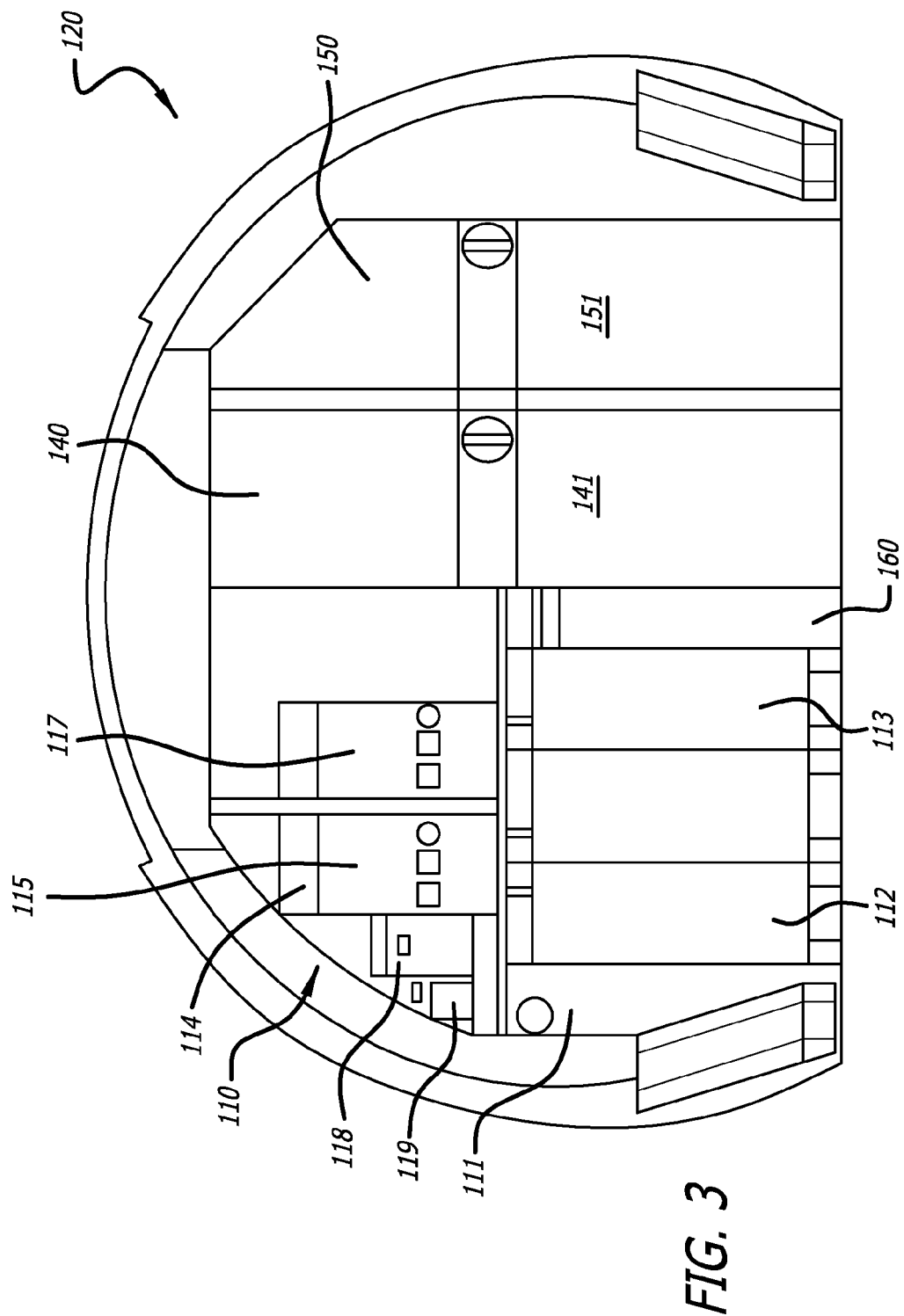
FIG. 3 is an enlarged front view looking rearward at the embodiment of FIG. 2.
Figure 4:
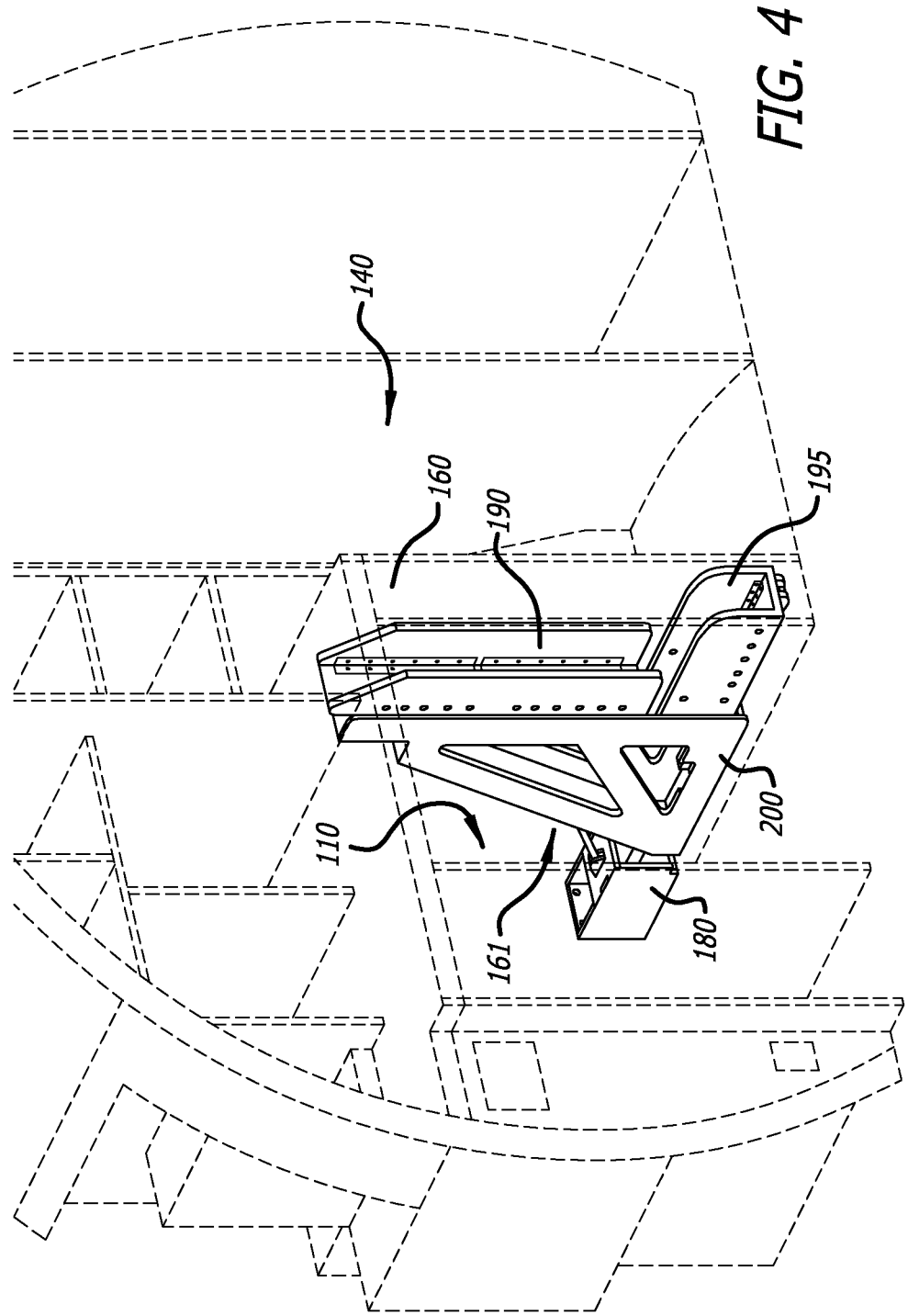
FIG. 4 is a perspective view looking rearward of the attendant seat compartment with the peripheral structure in shadow.
Figure 5:
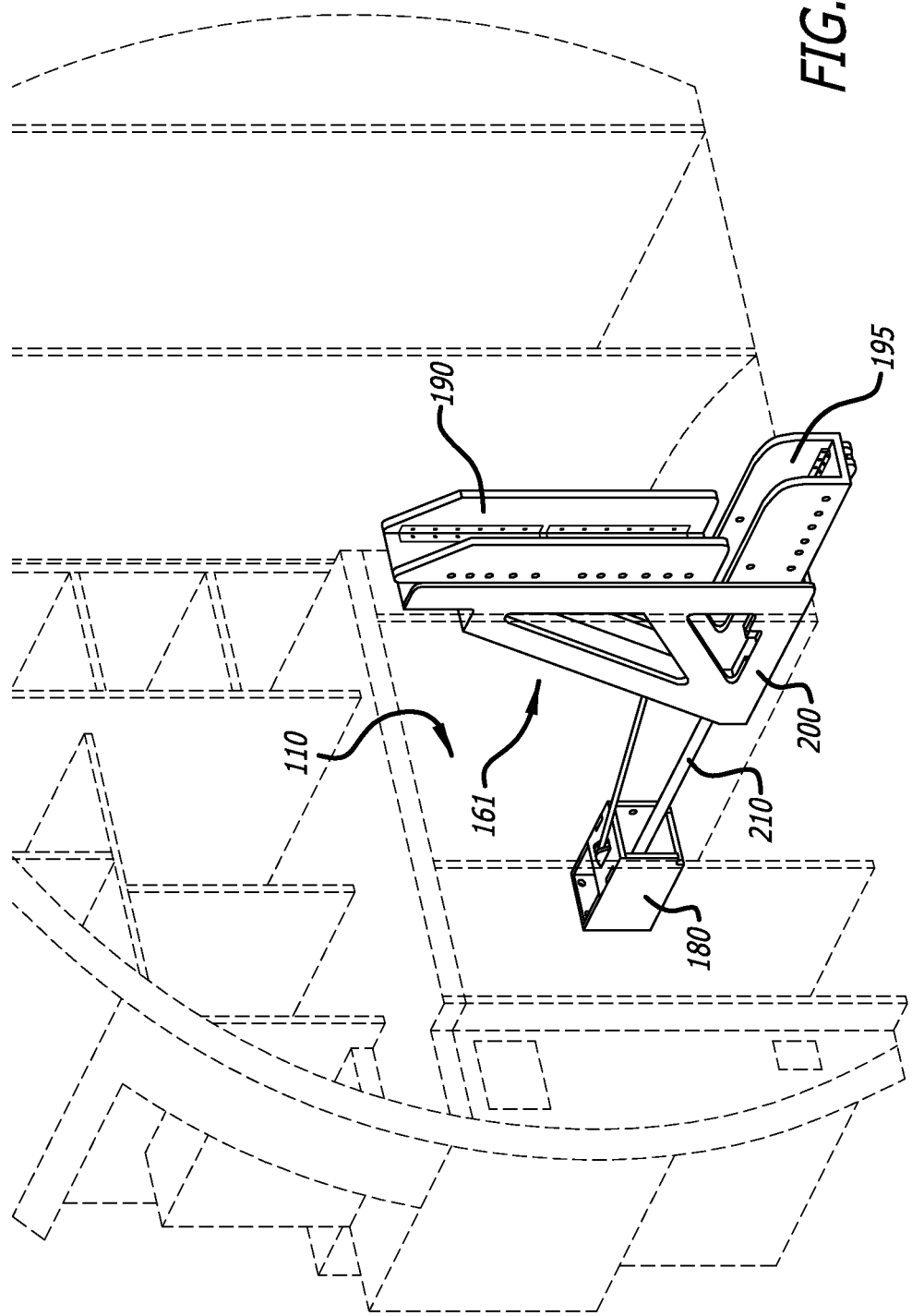
FIG. 5 is a perspective view of the attendant seat extending from its attendant seat compartment.
Figure 6:
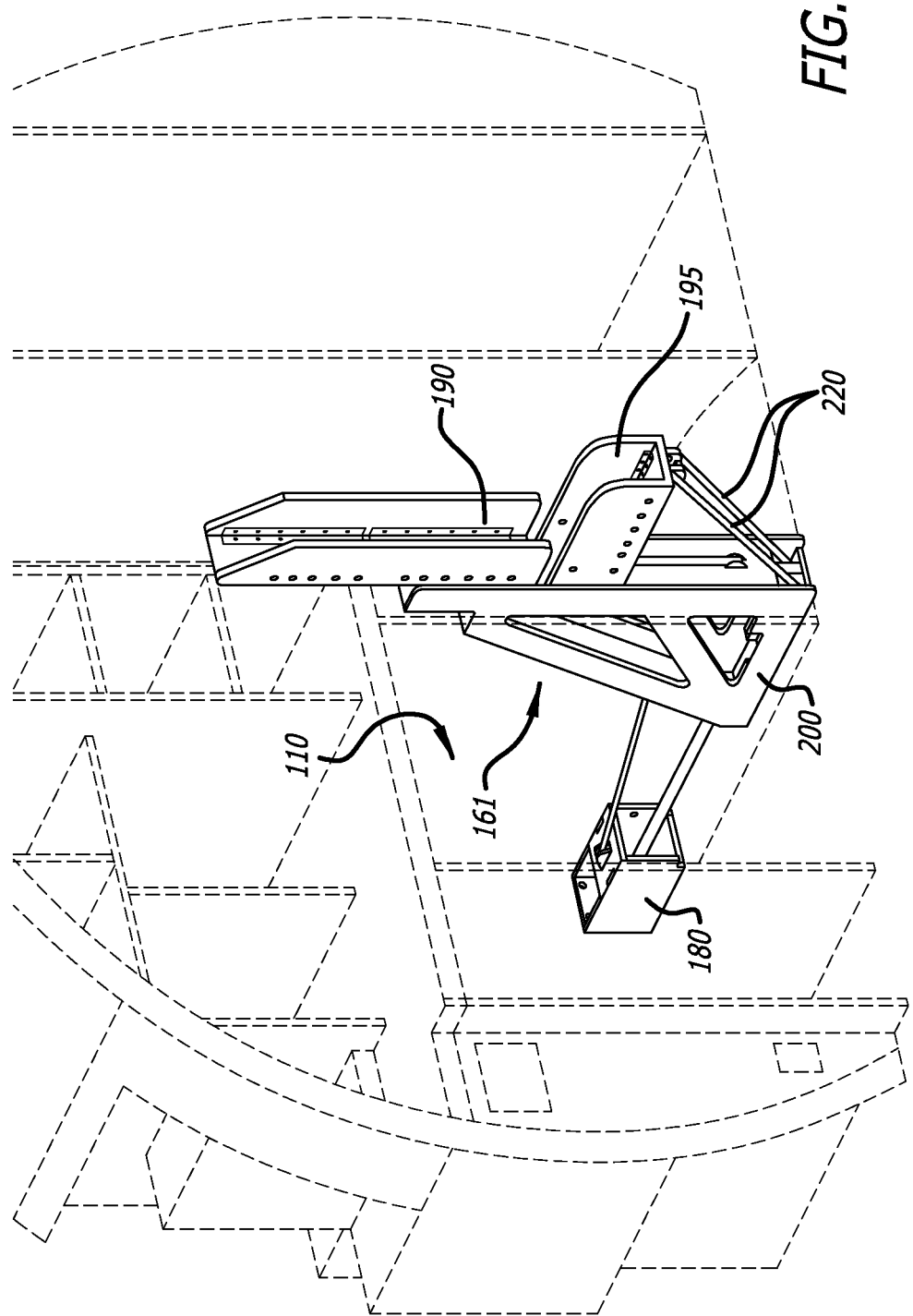
FIG. 6 is a perspective view of the attendant lift being lifted into position.
Figure 11:
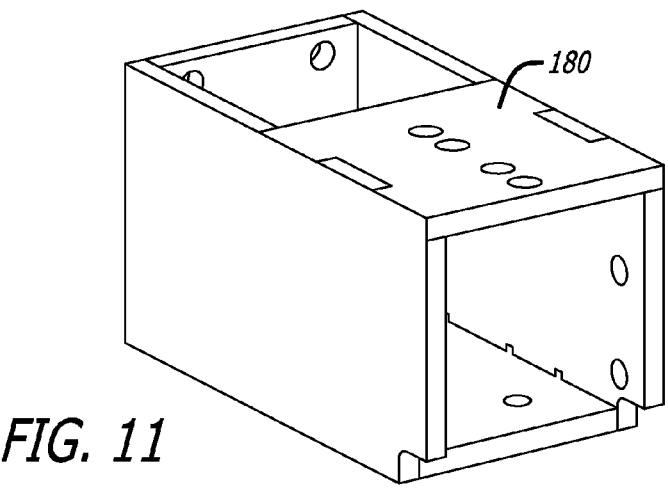
FIG. 11 is an enlarged, elevated perspective view of the anchor box.

As shown in FIG. 3, a Cabin Attendant Seat (CAS) stowage compartment 160 can be provided between the galley portion 110 and the inboard lavatory 140. FIGS. 4-7 illustrate the extraction and deployment of the cabin attendant seat 161. FIG. 4 illustrates the cabin attendant seat 161 fully stowed in the compartment 160. Within the cabin attendant seat stowage compartment 160 is a triangular sled 200 that can slide horizontally within the compartment 160. A weighted anchor box 180 secures the sled 200 and seat assembly 161 and prevents the sled from extending too far beyond the compartment 160. The cabin attendant seat 161 is comprised of a collapsible backrest 190 and a collapsible seat portion 195, both of which are preferably folded along a pair of hinges so as to fold up, and thus fit, within the stowage compartment 160. In FIG. 5, the sled 200 is displaced horizontally away from the anchor box 180 and toward the opening of the compartment 160, such that the folded seat 195 begins to emerge from the compartment. A rod 210 maintains contact between the sled 200 and the anchor box 180 (see FIG. 11) so that the sled 200 does not extend too far from the compartment 160. The sled 200 may have wheels or rollers on the bottom surface, or may glide along a horizontal track at the bottom of the compartment 160. In FIG. 6, the cabin attendant seat has fully emerged from the stowage compartment 160, while the sled 200 remains within the compartment and attached to the anchor box 180 via the rod 210. Further, the chair 161 is raised on a vertical lift of the sled, which can be mechanical, hydraulic, or manual. The seat is supported by a pair of stabilizing rods 220 that withdrawn from the underside of the seat and that maintain the seat in the horizontal position.

Figure 7:
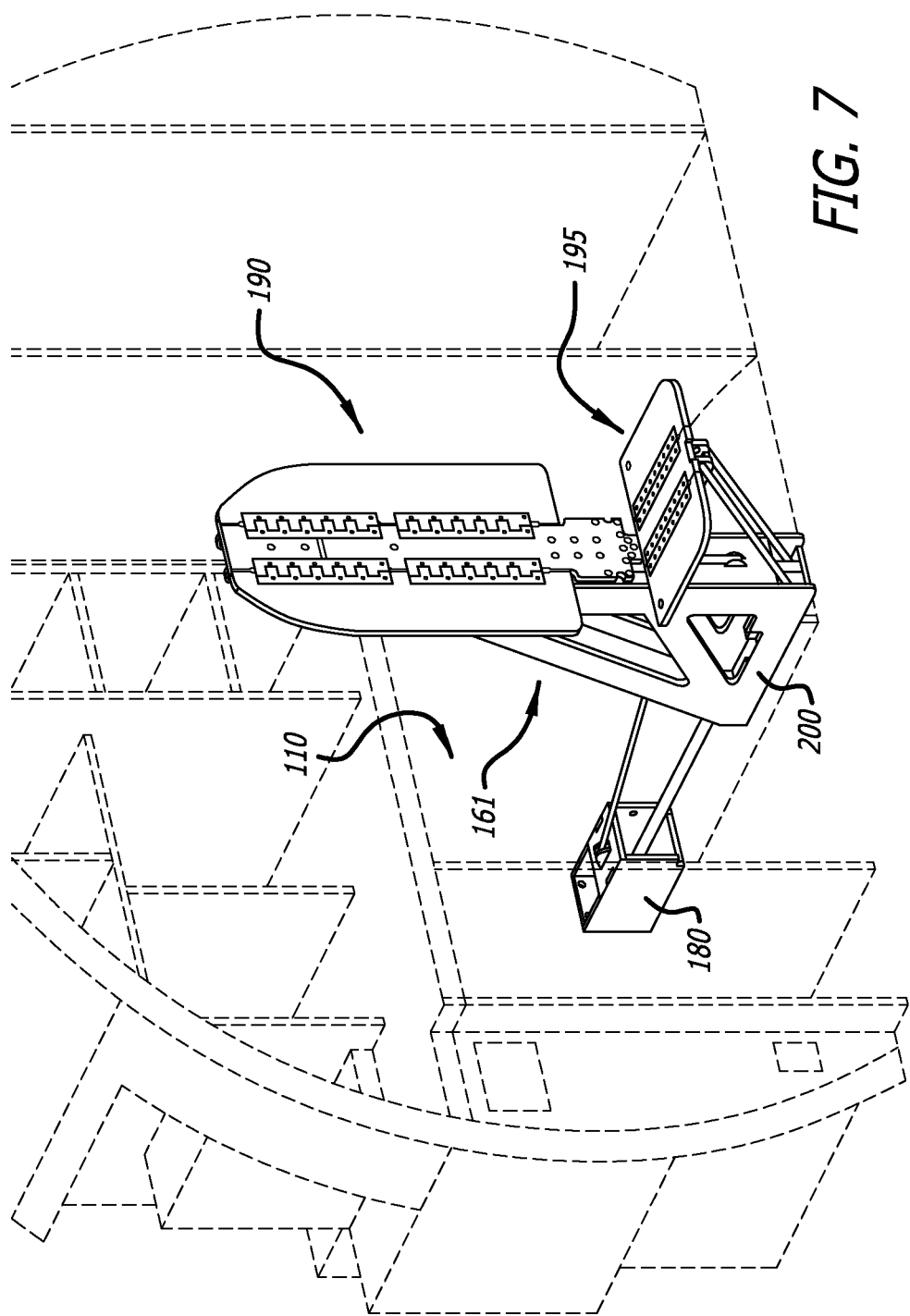
FIG. 7 is a cut-away view of the cabin attendant seat fully deployed.

FIG. 7 illustrates the chair 161 in the fully extended vertical position, where the seat 195 is at a comfortable height off the ground for sitting. In a preferred embodiment, the height can be adjustable to accommodate various attendants. The backrest 190 and the seat 195 are shown in the fully unfolded condition corresponding with a more traditional chair configuration, pivoting open along their respective pairs of hinges. A cover or padding (not shown) is placed over the seat to add comfort to the attendant and prevent clothing or skin from catching on the hinges or other sharp surfaces.

Figure 8:
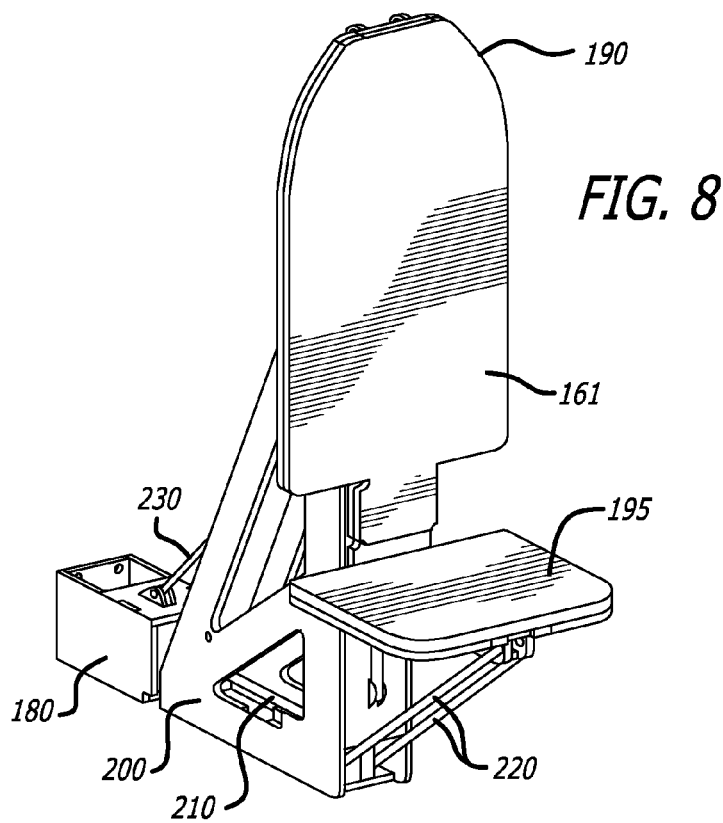
FIG. 8 is an elevated perspective view of the cabin attendant seat and sled outside of the compartment.
Figure 9:
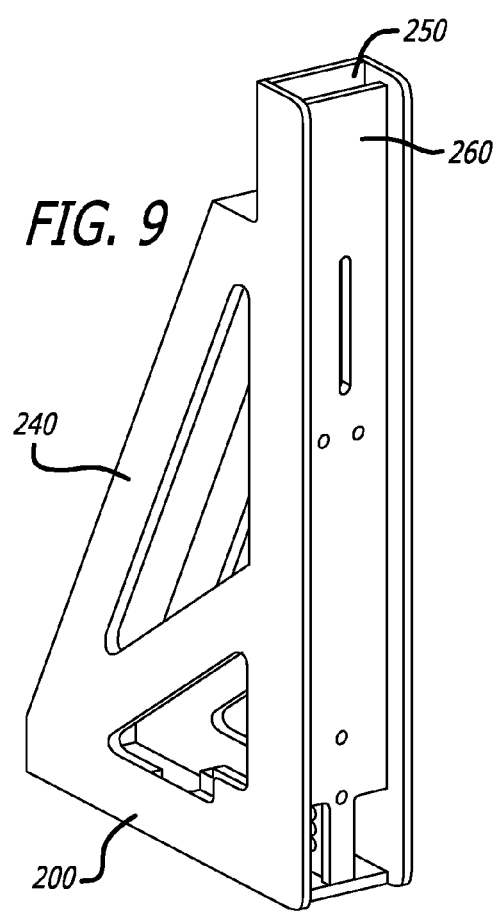
FIG. 9 is an elevated perspective view of the sled of the cabin attendant seat.
Figure 10:
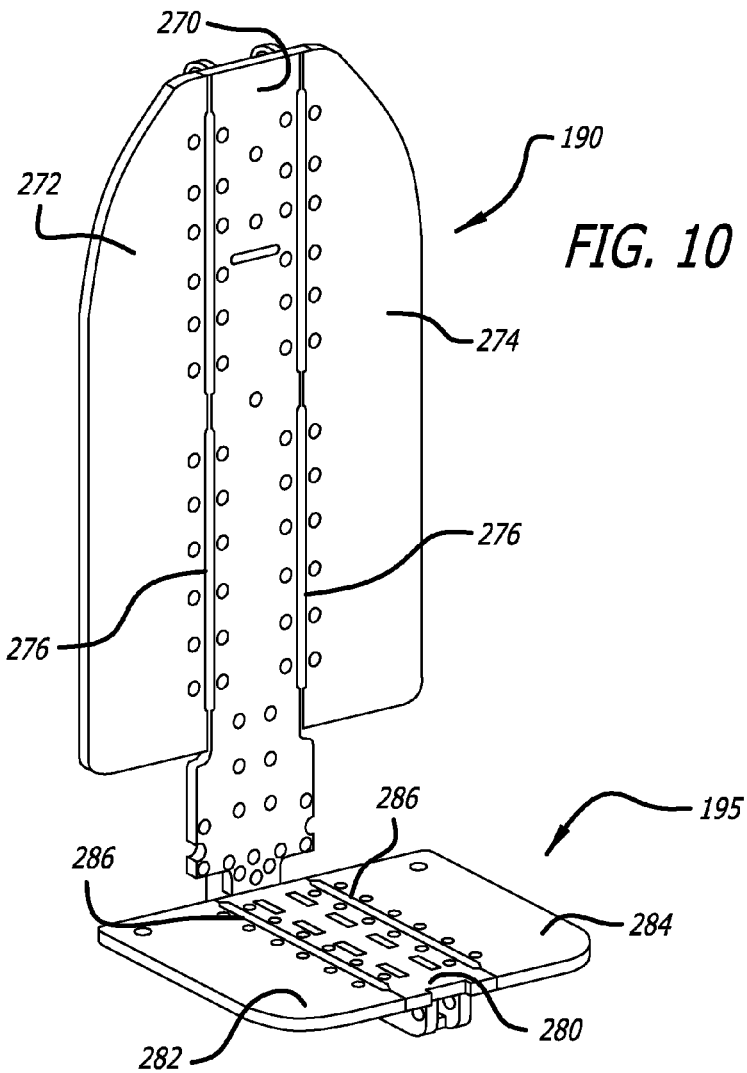
FIG. 10 is an elevated perspective view of seat.

FIG. 8 shows the cabin attendant seat assembly 161 outside of the compartment 160, including the anchor box 180, the sled 200, and the cabin attendant seat. Rod 210 connects the anchor box 180 to the sled 200, and stabilizing rods 220 connect the seat 195 of the assembly to the sled 200 and support the edge of the seat 195, such that when weight is placed on the seat 195 it is maintained in a level and safe position. An extendable connector rod 230 also connects the anchor box 180 to the sled 200 (see FIG. 12). In FIG. 9, the sled 200 is shown comprising an "A" frame truss structure 240 and a substantially vertical column 250 for mounting the back of the chair thereto, including a plate 260 to which the backrest 190 can be bolted or otherwise secured. FIG. 10 illustrates the chair, having a backrest 190 and a seat 195. The backrest 190 is formed with a central column 270, a left column 272, and a right column 274. The left and right columns 272,274 are fastened to the central column 270 along vertical piano hinges 276 or other hinge type. The hinges allow for at least ninety degree rotation with respect to the plane of the central column 270, allowing the backrest 190 to "fold" into a compact configuration. Similarly, the seat 195 is formed with a central panel 280, a left panel 282, and a right panel 284. The left and right panels 282,284 are fastened to the central panel 280 along horizontal piano hinges 286 or other hinge type. The hinges 286 allow for at least ninety degree rotation with respect to the plane of the central panel 280, allowing the seat 195 to "fold" in to a compact configuration.

Figure 12:
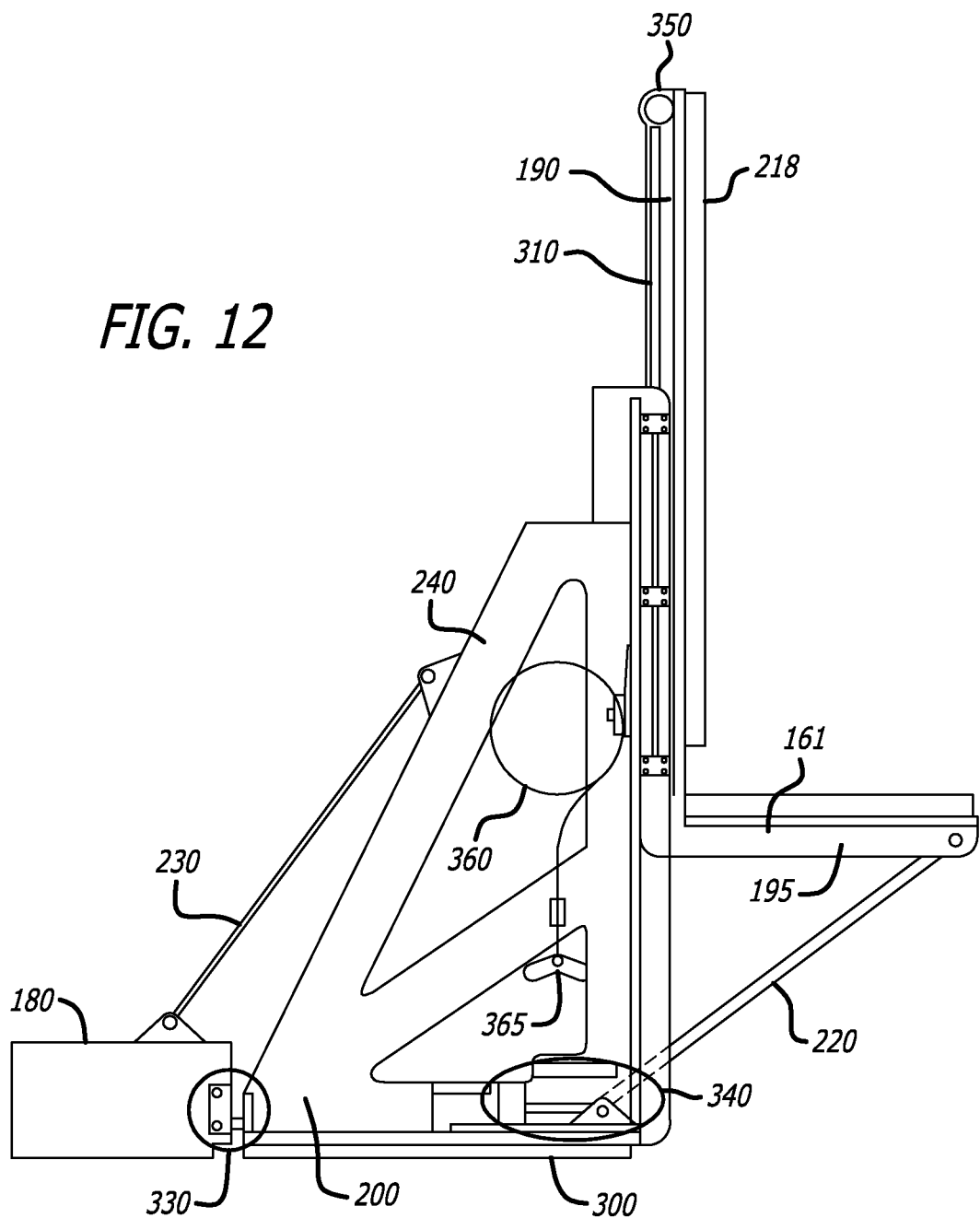
FIG. 12 is a side view of the sled and seat assembly on the horizontal slide.

FIG. 12 illustrates a side view of the cabin attendant seat assembly, including the anchor box 180, slide 200, and chair 161. A horizontal slide 300 is positioned at the bottom of the slide 200 to allow the assembly to move into and out of the compartment 160. Similarly, a vertical slide 310 allows the chair to move from the floor to a vertically extended position as shown in FIG. 17, and back to the floor position for stowage. The horizontal slide 300 can be configured with a push-push latch 330, where a first push locks the chair assembly in the stowed position, and a second push releases the latch and allows the chair to slide into the horizontally extended position. Also, the vertical slide can include a push to close latch 340 that allows the vertical slide 310 and the chair 161 to collapse with a single push movement, which can be initiated with a push button actuator 350. A release cable 360 and handle 365 is connected to the vertical slide 310 to unlock the chair 161 from the vertical slide 310.

In the compact configuration, the attendant chair can be fully withdrawn into the compartment 160, and then extracted when needed during take-off, landing, and rest periods. The sled allows vertical adjustment of the chair, and the various stabilizing members ensure a robust and safe seat. By combining the stowable attendant seat with the other features of the improved galley and floor plan, an additional row of seats can be added to a commercial aircraft, dramatically improving the efficiency and profitability of the aircraft on each flight.

These and other features and advantages of the invention will be apparent to a person of ordinary skill in the art from a reading of the above description and a review of the drawings. It will be apparent from the foregoing that while particular forms of the invention has been illustrated and described, various modifications and substitutions may be made to the embodiments described herein without departing from the spirit and scope of the invention. Accordingly, the present invention is not intended to be limited such foregoing descriptions and drawings, but rather that they be illustrative of the invention. The scope of the present invention is intended to include all such modifications and substitutions as would be recognized by one of ordinary skill in the art.

We claim:

1. A retractable chair for extension from an aircraft stowage compartment, comprising:
   an anchor box residing within the stowage compartment;
   a sled coupled to the anchor box for horizontal translation of the retractable chair into and out of the stowage compartment;
   a chair mounted on the sled, the chair including a backrest and a seat portion;
   the seat portion of the chair including a central panel, a left panel and a right panel, where the left and right panels are connected to the central panel by first and second hinges, respectively, so as to permit rotation of the left and right panels about said first and second hinges of at least ninety degrees;
   the backrest of the chair including a central column, a left column, and a right column, where the left and right columns are connected to the central column by third and fourth hinges, respectively, so as to permit rotation of the left and right columns about said third and fourth hinges of at least ninety degrees; and
   wherein the sled includes a vertical lift to raise the chair upon emerging from the stowage compartment.

2. The retractable chair of claim 1 further comprising stabilizing rods connecting the seat of the chair to sled.

3. The retractable chair of claim 1 further comprising an extendable connector rod connecting the anchor box to an upper portion of the sled.

4. The retractable chair of claim 1 wherein the sled comprises an A frame truss structure.

5. The retractable chair of claim 1, further comprising a releasable locking mechanism to lock the retractable chair inside of the compartment when not in use.

6. A retractable chair for extension from an aircraft stowage compartment, comprising:
   an anchor box residing within the stowage compartment;
   a sled coupled to the anchor box for horizontal translation of the retractable chair into and out of the stowage compartment;
   a chair mounted on the sled, the chair including a backrest and a seat portion;
   the seat portion of the chair including a central panel, a left panel and a right panel, where the left and right panels are connected to the central panel by first and second hinges, respectively, so as to permit rotation of the left and right panels about said first and second hinges of at least ninety degrees; and
   the backrest of the chair including a central column, a left column, and a right column, where the left and right columns are connected to the central column by third and fourth hinges, respectively, so as to permit rotation of the left and right columns about said third and fourth hinges of at least ninety degrees; and
   a releasable latch to collapse the chair with a single action.

7. A retractable chair for extension from an aircraft stowage compartment, comprising:

an anchor box residing within the stowage compartment;

a sled coupled to the anchor box for horizontal translation of the retractable chair into and out of the stowage compartment;

a chair mounted on the sled, the chair including a backrest and a seat portion;

the seat portion of the chair including a central panel, a left panel and a right panel, where the left and right panels are connected to the central panel by first and second hinges, respectively, so as to permit rotation of the left and right panels about said first and second hinges of at least ninety degrees; and the backrest of the chair including a central column, a left column, and a right column, where the left and right columns are connected to the central column by third and fourth hinges, respectively, so as to permit rotation of the left and right columns about said third and fourth hinges of at least ninety degrees; and a release cable connected to a vertical slide to unlock the chair from the vertical slide.

\* \* \* \* \*